Feb. 5, 1946.　　　　J. ZATZKIN　　　　2,394,352
BED SPRINGS BRACKET
Filed Oct. 18, 1944
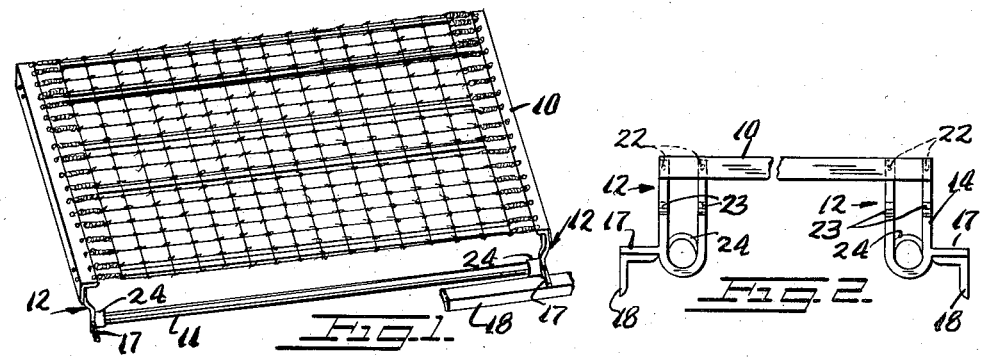
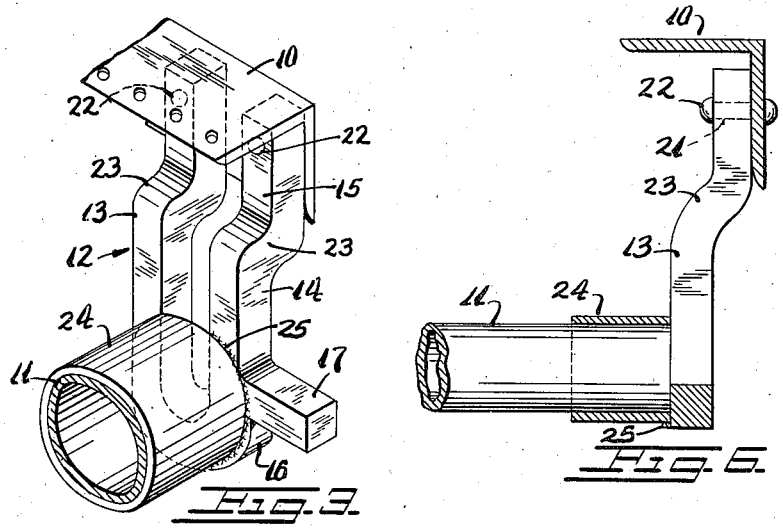
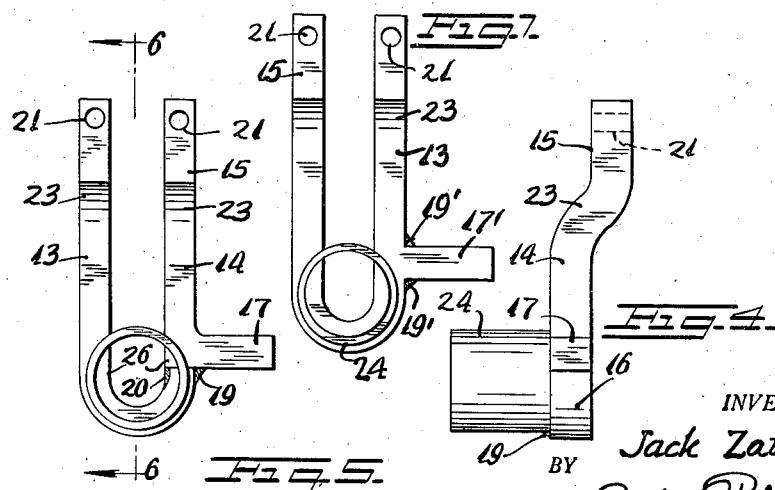
INVENTOR.
Jack Zatzkin
BY
ATTORNEY.

Patented Feb. 5, 1946

2,394,352

UNITED STATES PATENT OFFICE 2,394,352

BEDSPRING BRACKET

Jack Zatzkin, Brooklyn, N. Y.

Application October 18, 1944, Serial No. 559,149

4 Claims. (Cl. 5—205)

This invention relates to bed springs and to a method of making same.

More specifically, the present invention proposes the construction of a bracket for securing the longitudinal cylindrical or oval rods of a bed spring to the transverse angle irons thereof, the brackets being characterized by having an L-shaped leg and a J-shaped leg welded together.

Still further it is proposed to provide a bracket as aforesaid having a cylindrical or oval sleeve welded to the legs providing a support for the end of a cylindrical or oval rod of the spring.

Another object is to provide a bracket as aforesaid in which the foot of the L-shaped leg provides a support for mounting the bed spring on the side rods of a metal bed.

A further object is to provide a bracket of the aforesaid type but having a U or J shaped leg and a straight leg welded thereto, the bed spring with these brackets being adapted for use on a wooden bed.

Another object of the present invention is to provide a method of making the aforesaid brackets.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a perspective view of a bed spring constructed in accordance with this invention, a portion of a metal bed side rod being shown.

Fig. 2 is an end view of the spring of Fig. 1.

Fig. 3 is an enlarged fragmentary perspective view of a portion of the bed spring showing one of the brackets of the present invention.

Fig. 4 is an enlarged side view of one of the brackets.

Fig. 5 is an enlarged front view of one of the brackets.

Fig. 6 is a section on the line 6—6 of Fig. 5.

Fig. 7 is a similar view to Fig. 5 but illustrating another form of the invention.

The present invention is directed to provide a bed spring of conventional construction except for the four brackets at the four corners of the spring which connect the longitudinal side rods of the spring with the transverse angle irons. It is desired to provide brackets which may be made of easily obtainable low price metals and may be made by simple and economical fabricating methods. The bracket is made of bar iron and a section of pipe. The bar iron may be square, rectangular or round in cross section. The section of pipe is of an inside diameter suitable to act as a sleeve for the ordinary cylindrical or oval side rods of a conventional spring.

The brackets of the spring are similar in construction except that the two brackets on opposite corners of the spring are oppositely directed. That is to say, two of the brackets might be considered left hand brackets while the other two might be considered right hand brackets, as each bracket has an extending lug, as will presently appear, and considering the brackets at the same end of a spring, the lugs of these brackets extend outwardly one to the left side of the spring and the other to the right side of the spring. However, for simplicity, only one bracket will be described, it being understood that the other bracket is reversely built for employment on the other side of the spring.

The bed spring, according to this invention, comprises two spaced transverse angle irons 10 and two spaced longitudinal cylindrical or oval side rods 11 extending between the angle irons 10. On these angle irons is supported the spring portion of the bed spring, the rods acting to maintain the angle irons 10 in spaced relation.

The side rods 11 are connected to the angle irons 10 by brackets 12, there being a bracket at each corner of the bed spring. The bracket 12 is constructed for use with a bed spring adapted to be used with a conventional metal or wooden bed. As will later appear, this bracket may be changed slightly to adapt the spring to be employed with a conventional wooden bed only.

Bracket 12 is a fabricated structure. It is formed of a J-shaped leg 13 which is welded at the top of its short side to the bottom of an L-shaped leg 14, the vertical side 15 of the L-shaped leg 14 being in line with the short side 16 of the J-shaped leg. Thus the J-shaped leg and the vertical side of the L-shaped leg provide a U-shaped member. The horizontal side of lug 17 of the L-shaped leg extends laterally from the plane of the U-shaped member. This lug 17 provides means for mounting the bracket, and thus the bed spring, on the longitudinal side member 18 of a conventional metal or wooden bed, as is clearly shown in Fig. 1.

The two legs are welded together by a fillet weld 19 at the juncture of the short side of the J-shaped leg and the lug 17 and by a weld deposit 20 which seals the opposite seam between the short side of the J-shaped leg and the vertical side of the L-shaped leg. The upper ends of the legs are each provided with an orifice 21 and a rivet 22 extending through each of these orifices 21, securing the bracket to the angle iron 10, or may be welded to angle iron 10.

The U-shaped member is not disposed all in one plane but has an offset 23, as is clearly shown in Fig. 6, shaping the bracket in the usual manner of constructing such brackets, the offset 23 having a portion in each of the legs 13 and 14.

The bracket further includes a sleeve 24, this sleeve being formed of a section of pipe. Sleeve 24 abuts the U-bend of the U-shaped member and is welded thereto by a fillet weld 25. The metal of the U-bend extends inwardly of the inside diameter of the sleeve, providing a shoulder 26, as is clearly shown in Fig. 5. The cylindrical or oval side rod 11 has its end disposed in the sleeve. This side rod 11 may be loosely disposed in the sleeves, the shoulders 26 forming abutments for the side rods 11 and maintaining the bed spring square, limiting the movement of the angle irons 10 together. If desired, the side rods 11 may also be secured to the sleeves as by welding or riveting, the shoulders in such instance forming an abutment insuring correct positioning of the side rods to effect a squaring of the bed spring during its construction and further acting as abutments preventing the welds or rivets from being placed under shear when a load is supported on the bed spring.

As aforementioned, the bed spring, when equipped with the brackets of the type shown in the drawing, is adapted for use with a conventional metal bed. That is to say, the lugs 17 provide means for supporting the bed spring on the longitudinal side members 18 of the bed. Of course the bed spring may be employed with any bed having side members similar to the side members 18 regardless of the material from which the bed is constructed, but as these side members are usually employed in metal beds, the aforedescribed spring has been termed a spring for a metal bed, but it may also be used in connection with wooden beds.

In conventional wooden bed construction, it is customary to have wooded side members provided with an inwardly extending flange, the bed having a plurality of cross slats spanning the flanges, and the spring is supported on these slats. The spring of the present invention, provided with the lugs 17, may be employed in such a wooden bed, resting on the slats thereof, or the brackets may be constructed in the first place without the lugs 17 when it is contemplated that the spring will be employed in a wooden bed. The bracket may be made of any suitable metal such as iron, steel, brass or aluminum.

In Fig. 7 the bracket 13' is made U-shaped and lug portion 17' is shown to be welded to one leg of the U-shaped bracket 13', at 19'.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A bed spring comprising transverse angle iron end members, longitudinal tubular side rods, and a bracket at each corner of said spring securing the ends of said side rods to the correlated ends of said end members, each of said brackets including a J-shaped leg secured at its top to the adjacent end member, an L-shaped leg, having a vertical side welded to the top of the short side of said J-shaped leg and secured at its top to said adjacent end member, and a horizontal side extending laterally outward away from said J-shaped member and a tubular sleeve welded to said J-shaped leg and extending perpendicular to said J-shaped leg, the adjacent end of the adjacent side rod being disposed in said sleeve, said horizontal side forming a lug for supporting said bracket on a bed side member.

2. A bed spring comprising transverse angle iron end members, longitudinal tubular side rods, and a bracket at each corner of said spring securing the ends of said side rods to the correlated ends of said end members, each of said brackets including a J-shaped leg secured at its top to the adjacent end member, an L-shaped leg, having a vertical side welded to the top of the short side of said J-shaped leg and secured at its top to said adjacent end member, and a horizontal side extending laterally outward away from said J-shaped member and a tubular sleeve welded to said J-shaped leg and extending perpendicular to said J-shaped leg, the adjacent end of the adjacent side rod being disposed in said sleeve, said horizontal side forming a lug for supporting said bracket on a bed side member, at least one of said legs having a portion extending inwardly of said sleeve providing a shoulder adapted to abut said adjacent side rod end.

3. A bed spring comprising transverse angle iron end members, longitudinal tubular side rods, and a bracket at each corner of said spring securing the ends of said side rods to the correlated ends of said end members, each of said brackets including a J-shaped leg secured at its top to the adjacent end member, an L-shaped leg, having a vertical side welded to the top of the short side of said J-shaped leg and secured at its top to said adjacent end member, and a horizontal side extending laterally outward away from said J-shaped member and a tubular sleeve welded to said J-shaped leg and extending perpendicular to said J-shaped leg, the adjacent end of the adjacent side rod being disposed in said sleeve, said horizontal side forming a lug for supporting said bracket on a bed side member, said legs being offset longitudinally inwardly from said adjacent end member.

4. A bed spring comprising transverse angle iron end members, longitudinal tubular side rods, and a bracket at each corner of said spring securing the ends of said side rods to the correlated ends of said end members, each of said brackets including a J-shaped leg, rectangular in cross section and secured at its top to the adjacent end member, an L-shaped leg, rectangular in cross section, and welded to the top of the short side of said J-shaped leg, in line therewith and secured at its top to said adjacent end member, the horizontal foot of said L-shaped member extending laterally outward, and a tubular sleeve welded to said J-shaped leg and extending perpendicular to said J-shaped leg, the adjacent end of the adjacent side rod being disposed in said sleeve.

JACK ZATZKIN.